(12) United States Patent
Vorobyev

(10) Patent No.: US 8,717,607 B2
(45) Date of Patent: May 6, 2014

(54) IMAGE FORMING APPARATUS, IMAGE PROCESSING SYSTEM, AND IMAGE PROCESSING METHOD

(75) Inventor: Konstantin Vorobyev, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 192 days.

(21) Appl. No.: 13/304,495

(22) Filed: Nov. 25, 2011

(65) Prior Publication Data

US 2012/0140273 A1 Jun. 7, 2012

(30) Foreign Application Priority Data

Dec. 1, 2010 (JP) .................................. 2010-268378

(51) Int. Cl.
*G06F 12/00* (2006.01)
(52) U.S. Cl.
USPC ........................... 358/1.15; 709/224; 709/203
(58) Field of Classification Search
USPC ....................................................... 358/1.15
See application file for complete search history.

(56) References Cited

U.S. PATENT DOCUMENTS

| | | | |
|---|---|---|---|
| 2004/0172469 A1 | 9/2004 | Takahashi et al. | |
| 2005/0036793 A1* | 2/2005 | Endo | 399/10 |
| 2008/0086561 A1* | 4/2008 | Dang et al. | 709/224 |
| 2008/0186532 A1 | 8/2008 | Ogasawara | |
| 2008/0301219 A1* | 12/2008 | Thornburgh et al. | 709/203 |
| 2009/0174893 A1* | 7/2009 | Fujii et al. | 358/1.15 |
| 2009/0237726 A1* | 9/2009 | Fujisawa | 358/1.15 |
| 2010/0079803 A1* | 4/2010 | Takeya | 358/1.15 |
| 2010/0277765 A1* | 11/2010 | Aritomi et al. | 358/1.15 |
| 2011/0202757 A1* | 8/2011 | Nakagawa et al. | 713/153 |
| 2011/0225321 A1 | 9/2011 | Vorobyev | |
| 2011/0242594 A1* | 10/2011 | Yabe | 358/1.15 |

FOREIGN PATENT DOCUMENTS

| | | |
|---|---|---|
| JP | 2004-220562 | 8/2004 |
| JP | 2008-191883 | 8/2008 |
| JP | 2011-191989 | 9/2011 |

* cited by examiner

*Primary Examiner* — Benny Q Tieu
*Assistant Examiner* — Daryl Jackson
(74) *Attorney, Agent, or Firm* — IPUSA, PLLC

(57) ABSTRACT

An image forming apparatus connected to a plural servers and includes a storage part including a log data storage area and configured to store log data into the log data storage area being divided into a first area capable of retaining a first predetermined number of log data items and a second area capable of retaining a second predetermined number of log data items, a data management part configured to manage the storing of the log data into the log data storage area, and a notice transmission part configured to instruct the plural servers to obtain the log data stored in the log data storage area by simultaneously transmitting a notice to the plural servers. The data management part instructs the notice transmission part to transmit the notice when the number of times of storing the log data becomes equivalent to the first predetermined number.

6 Claims, 8 Drawing Sheets

IMAGE FORMING APPARATUS, IMAGE PROCESSING SYSTEM, AND IMAGE PROCESSING METHOD

BACKGROUND OF THE INVENTION

1. Field of the Invention

The present invention relates to an image forming apparatus, an image processing system, and an image processing method, for example, an image forming apparatus, an image processing system, and an image processing method for providing log data to plural servers connected to the image forming apparatus.

2. Description of the Related Art

In recent years and continuing, plural image forming apparatuses (e.g., printers) are connected to each other via a network (system) inside an office or the like. The plural image forming apparatus are typically used separately depending on the intended use. Typically, in a system having plural image forming apparatuses connected to each other, a server is used for managing the plural image forming apparatuses. Thereby, the jobs (print jobs) executed by the image forming apparatuses can be managed.

The server manages the print jobs by using, for example, a device management program. For example, Japanese Laid-Open Patent Publication No. 2008-191883 discloses a printing system having a server that manages print jobs.

As another example, there is a system having a server that obtains and manages log information of an image forming apparatus. In a case of managing log information of an image forming apparatus with a server, there is a method of obtaining log information by storing the log information the image forming apparatus and periodically accessing the log information stored in the image forming apparatus. As another method, a server accesses an image forming apparatus at predetermined intervals and determines whether log information is stored in the image forming apparatus.

In a case of periodically accessing log information of an image forming apparatus where the log information is managed by a server according to a related art example, the image forming apparatus is to have the log information stored therein until the log information is obtained by the server. Therefore, the image forming apparatus is to have a large storage space for storing the log information. Further, in the case where the server determines whether log information is stored in the image forming apparatus, the workload of the server becomes large.

SUMMARY OF THE INVENTION

The present invention may provide an image forming apparatus, an image processing system, and an image processing method, that substantially obviates one or more of the problems caused by the limitations and disadvantages of the related art.

Features and advantages of the present invention are set forth in the description which follows, and in part will become apparent from the description and the accompanying drawings, or may be learned by practice of the invention according to the teachings provided in the description. Objects as well as other features and advantages of the present invention will be realized and attained by an image forming apparatus, an image processing system, and an image processing method particularly pointed out in the specification in such full, clear, concise, and exact terms as to enable a person having ordinary skill in the art to practice the invention.

To achieve these and other advantages and in accordance with the purpose of the invention, as embodied and broadly described herein, an embodiment of the present invention provides an image forming apparatus connected to plural servers, the image forming apparatus including a storage part including a log data storage area and configured to store log data into the log data storage area, the log data storage area being divided into a first area capable of retaining a first predetermined number of log data items and a second area capable of retaining a second predetermined number of log data items, a data management part configured to manage the storing of the log data into the log data storage area, and a notice transmission part configured to instruct the plural servers to obtain the log data stored in the log data storage area by simultaneously transmitting a notice to the plural servers, wherein the data management part instructs the notice transmission part to transmit the notice when the number of times of storing the log data becomes equivalent to the first predetermined number.

Other objects, features and advantages of the present invention will become more apparent from the following detailed description when read in conjunction with the accompanying drawings.

DETAILED DESCRIPTION OF THE PREFERRED EMBODIMENTS

According to the below-described embodiments of the present invention, an image forming apparatus has a storage area in which log data is stored for a predetermined number of times. The image forming apparatus simultaneously transmits a notice reporting the storage status of log data stored in the storage area to a server(s) based on, for example, the number of times of storing log data in the storage area.

[First Embodiment]

Figure 1:
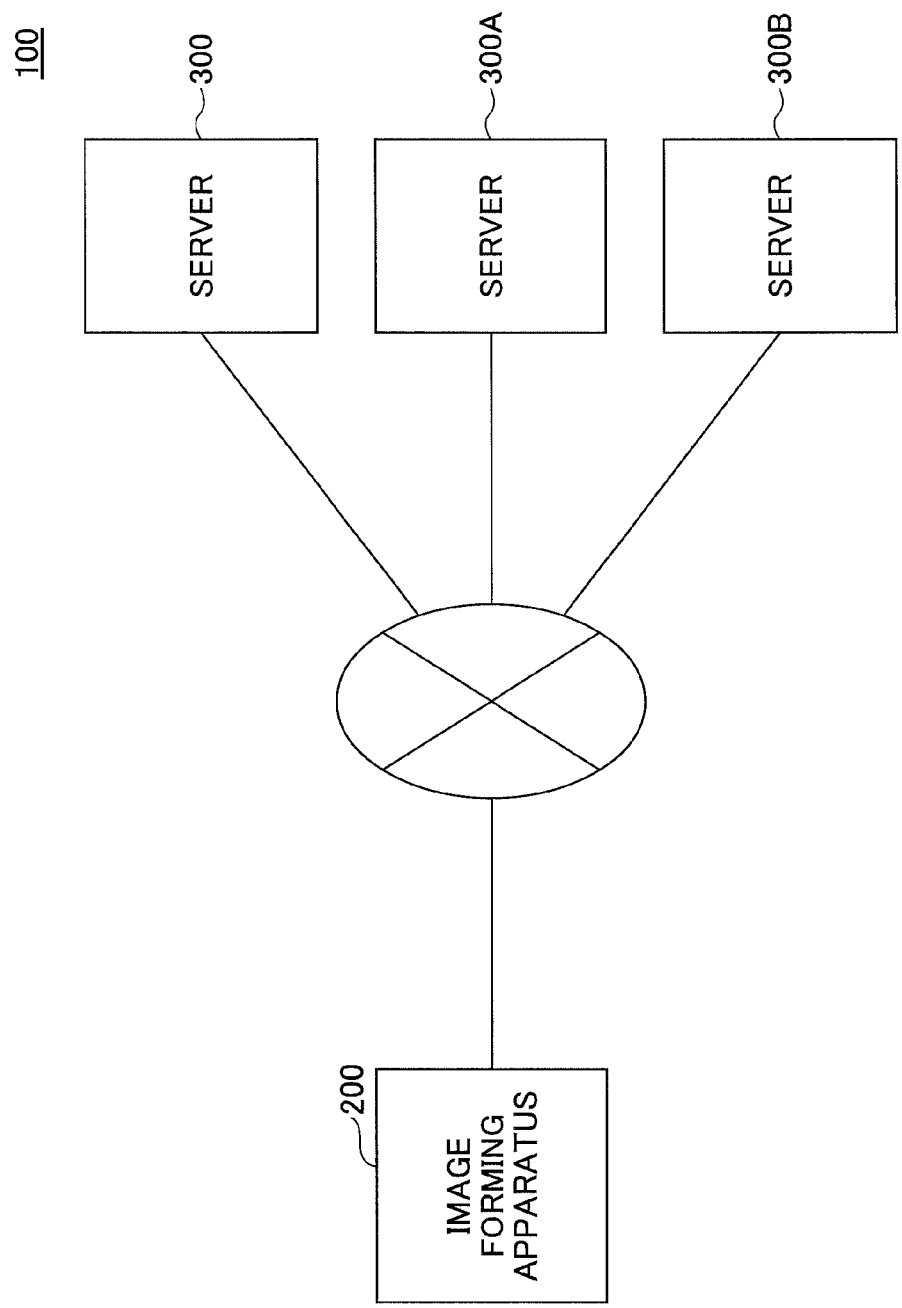
FIG. 1 is a schematic diagram illustrating an image processing system according to an embodiment of the present invention.

FIG. 1 is a schematic diagram illustrating an image processing system 100 according to a first embodiment of the present invention.

The image processing system 100 includes, for example, an image forming apparatus 200, and servers 300, 300A, 300B that are connected to a network. In the image processing system 100, log data (e.g., data indicating a history of processes executed by the image forming apparatus 200) is provided to the servers 300, 300A, and 300B, so that the log data can be used for services provided by the servers 300, 300A, and 300B. Although there is one image forming apparatus 200 and three servers 3 in this embodiment, the number of image forming apparatuses and the number of serves are not limited to those of this embodiment. That is, the number of the image forming apparatuses and servers is discretionary.

Next, a hardware configuration of the image forming apparatus 200 according to an embodiment of the present invention is described.

Figure 2:
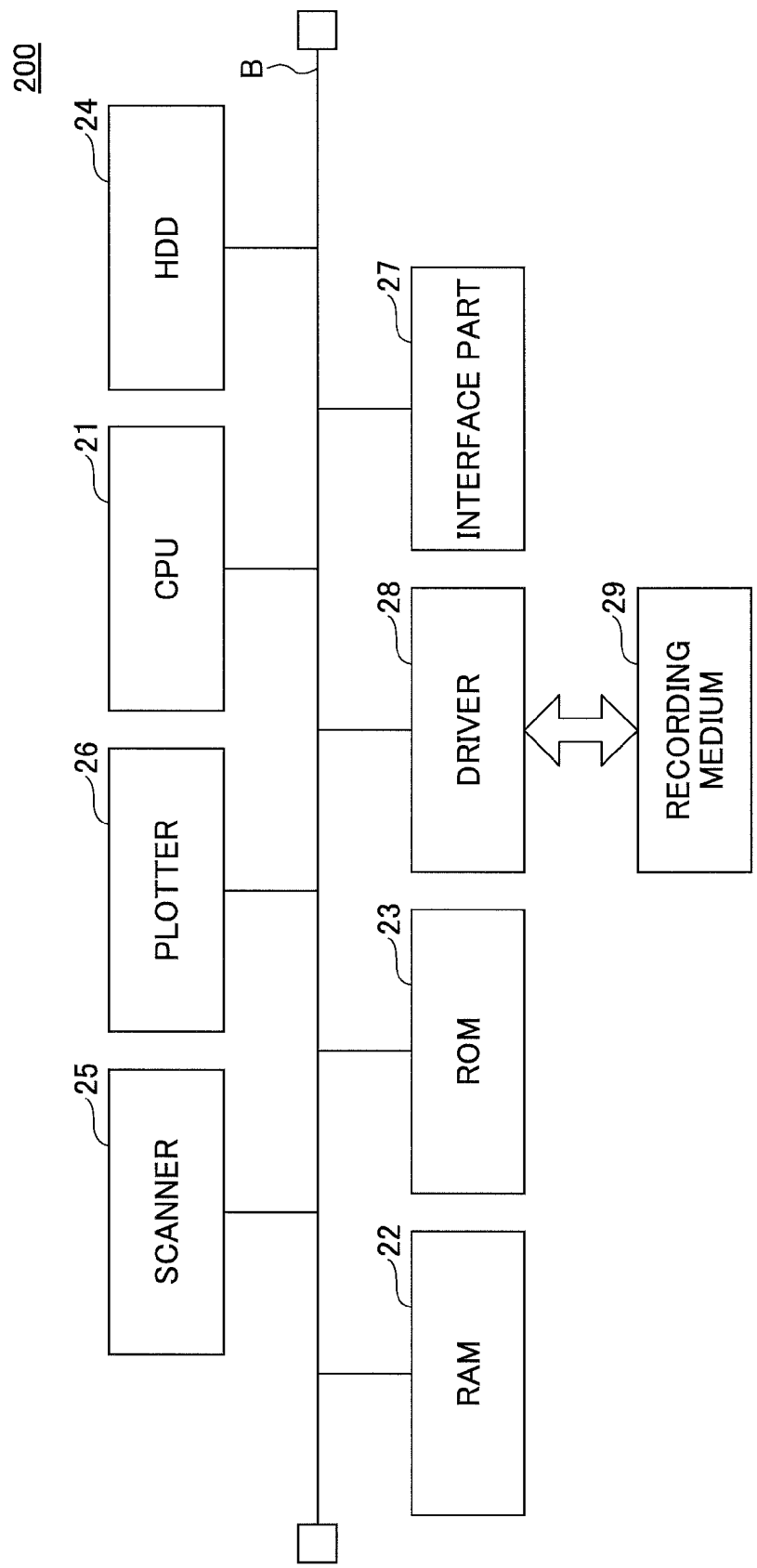
FIG. 2 is a schematic diagram illustrating a hardware configuration of an image forming apparatus according to an embodiment of the present invention.

FIG. 2 is a schematic diagram illustrating the hardware configuration of the image forming apparatus 200 according to an embodiment of the present invention. The image forming apparatus 200 includes, for example, a CPU (Central Processing Unit) 21, a RAM (Random Access Memory) 22, a ROM (Read Only Memory) 23, a HDD (Hard Disk Drive) 24, a scanner 25, a plotter 26, an interface part 27, and a driver 28 that are connected by a data bus B.

The CPU 21 performs controls and calculations with respect to various processes (e.g., generating of log data, storing of log data, managing the storing of log data, simultaneously transmitting a notice) performed by parts and components constituting the image forming apparatus 200. The RAM 22 temporarily stores various data. The ROM 23 stores, for example programs, fonts, and other static data. The HDD 24 stores non-volatile data. The scanner 25 reads out image data from a manuscript (original copy) or the like. The plotter 6 performs printing by transferring the image data read out by the scanner 25 to a transfer paper.

The interface part 27 is connected to, for example, a cable (e.g., Ethernet (Registered Trademark) or a network (e.g., LAN (Local Area Network)) for enabling communication between the image forming apparatus 200 and other external devices. The driver 28 installs, for example, a program recorded in a computer-readable recording medium 29 to the image forming apparatus 200.

An image processing program according to an embodiment of the present invention may be recorded in the computer-readable recording medium 29. The image processing program is a part of a program used for operating the image forming apparatus 200. Accordingly, the image processing program recorded in the computer-readable recording medium 29 is read out by the driver 28 and is stored in the HDD 24.

Next, a hardware configuration of the servers 300, 300A, and 300B according to an embodiment of the present invention is described.

Figure 3:
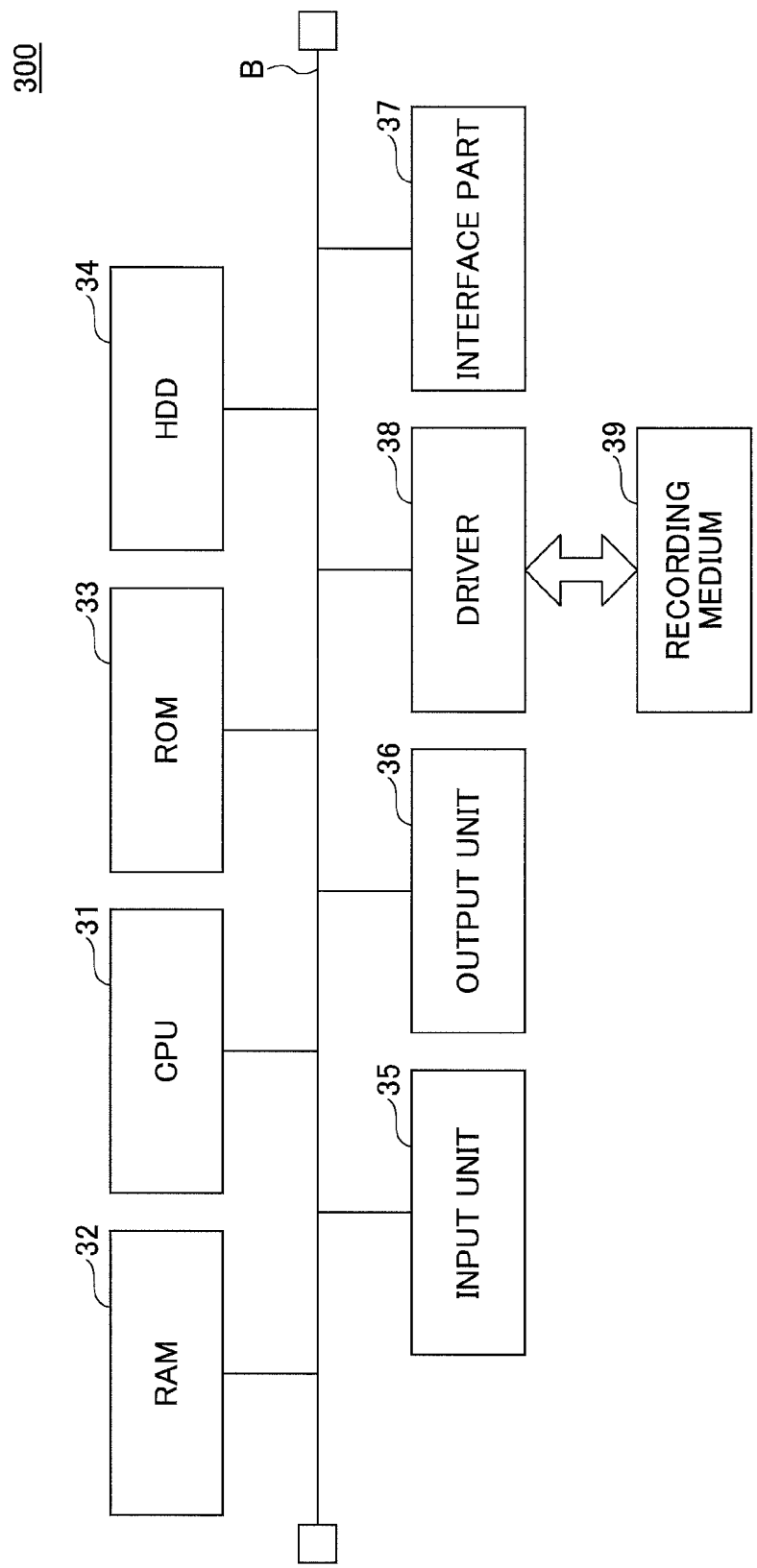
FIG. 3 is a schematic diagram illustrating a hardware configuration of a server according to an embodiment of the present invention.

FIG. 3 is a schematic diagram illustrating the hardware configuration of the server 300 according to an embodiment of the present invention. It is to be noted that the hardware configuration of the server 300 illustrated in FIG. 3 is substantially the same as the hardware configuration of the servers 300A and 300B.

The server 300 includes, for example, a CPU 31, a RAM 32, a ROM 33, a HDD 34, an input unit 35, an output unit 36, an interface part 37, and a driver 38 that are connected by a data bus B.

The CPU 31 performs controls and calculations of the various parts and components constituting the server 300. The RAM 32 temporarily stores various data. The ROM 33 stores, for example programs, fonts, and other static data. The HDD 34 stores non-volatile data. The input unit 35 inputs data to the server 300. The output unit 36 outputs data from the server 300.

The interface part 37 is connected to, for example, a cable (e.g., Ethernet (Registered Trademark) or a network (e.g., LAN (Local Area Network)) for enabling communication between the server 300 and other external devices. The driver 38 installs, for example, a program recorded in a computer-readable recording medium 39 to the server 300.

Figure 4:
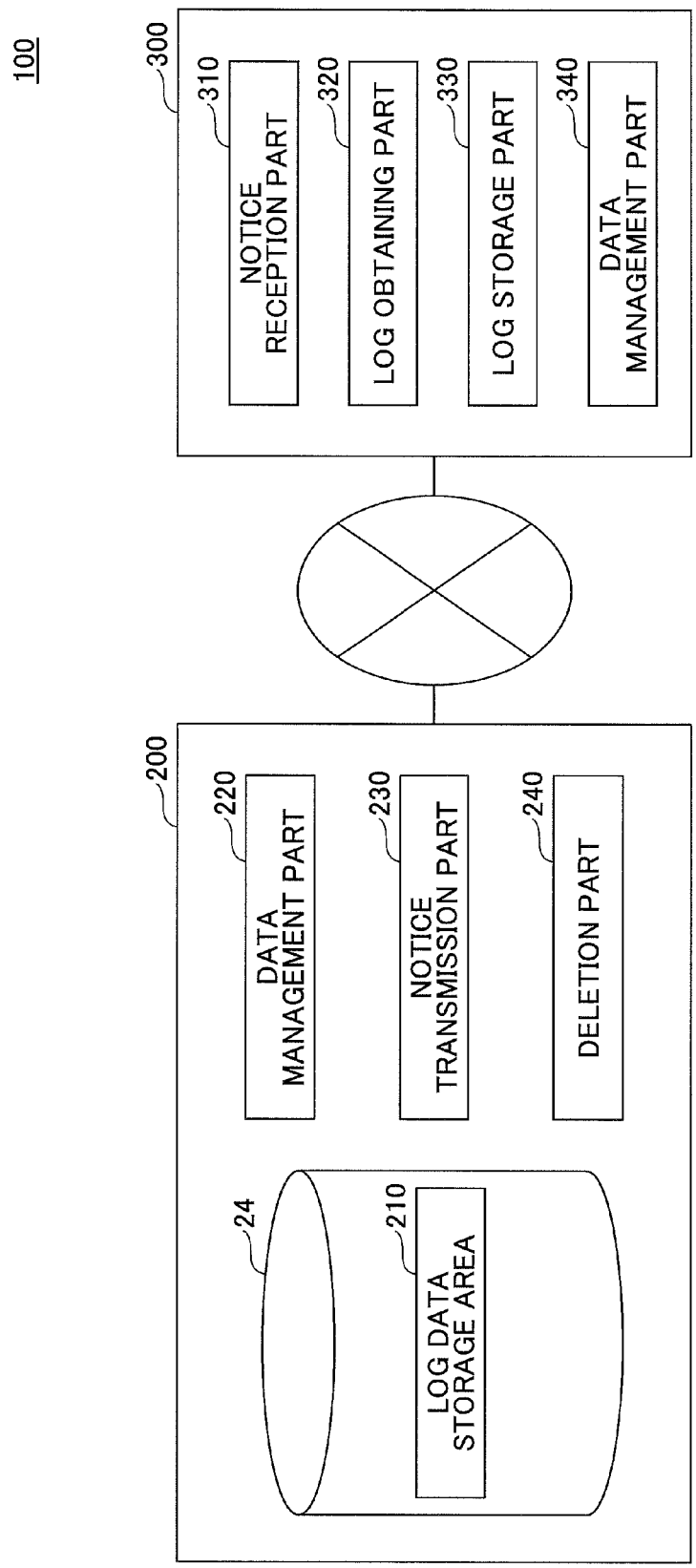
FIG. 4 is a schematic diagram illustrating functional configurations of an image forming apparatus and a server constituting an image processing system according to an embodiment of the present invention.

Next, functional configurations of the image forming apparatus 200 and the server 300 constituting an image processing system 100 according to an embodiment of the present invention are described. FIG. 4 is a schematic diagram illustrating the functional configurations of the image forming apparatus 200 and the server 300 constituting the image processing system 100 according to the first embodiment of the present invention. Because the functional configuration of the servers 300, 300A and 300B are substantially the same, FIG. 4 illustrates the functional configuration of the server 300 as an example.

The image forming apparatus 200 according to an embodiment of the present invention includes, for example, a log data storage area 210, a data management part 220, a notice transmission part 230, and a deletion part 240.

In this embodiment, the log data storage area 210 is provided in a storage area of, for example, the HDD 24 of the image forming apparatus 200. Further, in this embodiment, the size (capacity) of the log data storage area 210 is predetermined. Accordingly, a predetermined number of log data items can be stored in the log data storage area 210. Details of the log data storage area 210 is described below.

The data management part 220 manages the storage of log data in the log data storage area 210. The log data includes, for example, data indicating the time/date in which a print job is executed by the image forming apparatus 200, data indicating the number of printed pages, data indicating the name of data of a printed document, and/or data indicating the settings (output settings) applied when performing printing. Each of the various types of log data has substantially the same data size.

In a case where a predetermined number of log data items are stored in the log data storage area 210, the notice transmission part 230 simultaneously transmits a notice indicating that the predetermined number of log data items has been stored in the log data storage area 210 to all of the servers 300, 300A, and 300B connected to the image forming apparatus 200 (simultaneous transmission). The deletion part 240 deletes (erases) the log data stored in the log data storage area 210.

In this embodiment, the server 300 includes, for example, a notice reception part 310, a log obtaining part 320, a log storage part 330, and a data management part 340.

The notice reception part 310 receives a notice(s) from the notice transmission part 230 of the image forming apparatus 200. The log obtaining part 320 obtains log data stored in the log data storage area 210 of the image forming apparatus 200 when the notice reception part 310 receives the notice. The log storage part 330 stores the log data obtained by the log obtaining part 320 in, for example, the HDD 34. The data management part 340 manages the log data stored by the log storage part 330.

Figure 5:
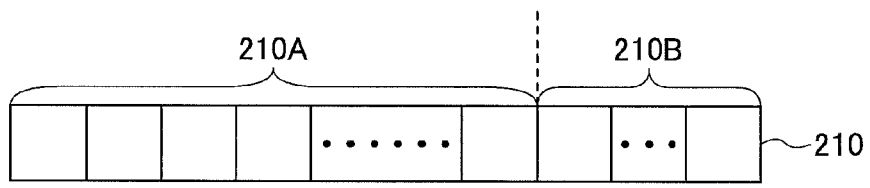
FIG. 5 is a schematic diagram illustrating a log data storage area according to an embodiment of the present invention.

Next, the log data storage area 210 according to an embodiment of the present invention is described with reference to FIG. 5. FIG. 5 is a schematic diagram illustrating the log data storage area 210 according to an embodiment of the present invention.

The log data storage area 210 is divided into a first area 210A and a second area 210B, each of which capable of storing a predetermined number of log data items therein. In this embodiment, the first area 210A can store n log data items, and the second area 210B can store k log data items.

In a case of storing new log data in the log data storage area 210, the data management part 220 manages the storage of log data, so that the new log data is stored at the rearmost part of the data storage area 210. In a case of extracting log data stored in the log data storage area 210, the data management part 220 manages the storage of log data, so that the log data is extracted starting from the oldest log data (i.e. log data stored earliest in the log data storage area 210 is extracted with priority). In other words, the log data storage area 210 and the data management part 220 according to an embodiment of the present invention constitute a queue.

In this embodiment, when the first area 210A becomes full (memory full state) by storing n log data items in the first area 210A of the log data storage area 210, the notice transmission part 230 simultaneously transmits a notice informing the memory full state and instructing the servers 300, 300A, and 300B to obtain the log data stored in the log data storage area 210. In a case where new log data is generated during a period starting from a time in which the first area 210A becomes full to a time in which the log data stored in the log data storage area 210 are obtained by each of the servers 300, 300A, 300B, the log data stored in the first area 210A is forced out to the second area 210B and the new log data is stored (added) to the first area 210A.

In this embodiment, by setting the value of the number of log data items storable in the second area 210B to an appropriate number, each of the servers 300, 300A, and 300B can obtain the log data stored in the log data storage area 210 before the second area 210B becomes full.

Figure 6:
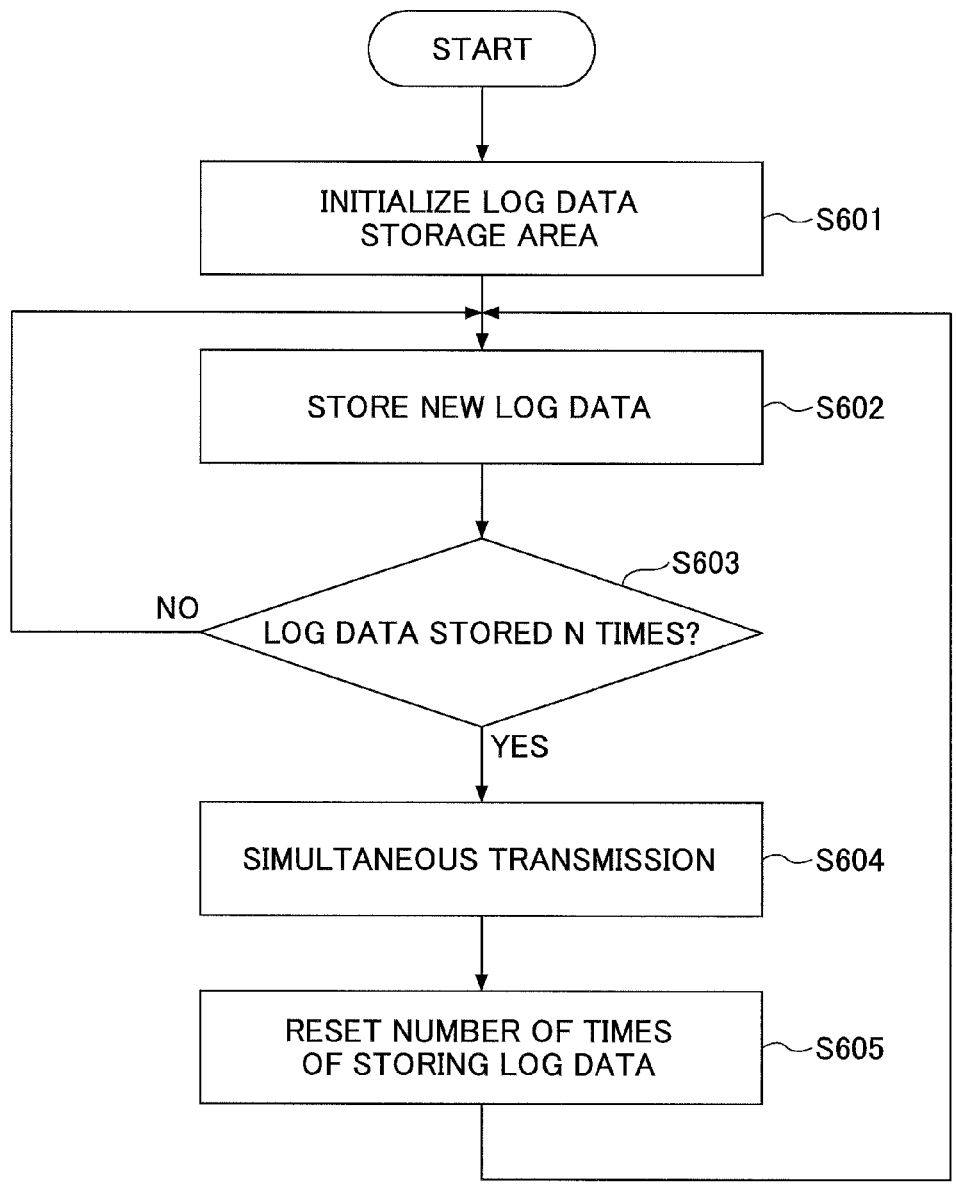
FIG. 6 is a flowchart illustrating an operation performed by an image forming apparatus according to an embodiment of the present invention.

An operation performed by the image forming apparatus 200 according to an embodiment of the present invention is described with reference to FIG. 6. FIG. 6 is a flowchart illustrating an operation performed by the image forming apparatus 200 according to an embodiment of the present invention.

First, the image forming apparatus 200 initializes the log data storage area 210 (Step S601). The initialization of the log data storage area 210 is performed when, for example, the image forming apparatus 200 is activated.

Then, log data is generated when the image forming apparatus 200 performs an image forming process. When the log data is generated, the data management part 220 stores the generated log data into the log data storage area 210 (Step S602). Then, the data management part 220 determines whether the storage of log data has been conducted for n times (Step S603).

In a case where the storage of log data has not been conducted for n times (No in Step S603), the data management part 220 returns to Step S602 and continues to store log data into the log data storage area 210. In a case where the storage of log data has been conducted for n times (Yes in Step S603), the data management part 220 instructs the notice transmission part 230 to perform the transmission of notices to the servers 300, 300A, and 300B. When the notice transmission part 230 receives the instruction from the data management part 230, the notice transmission part 230 simultaneously transmits a notice to the servers 300, 300A, 300B instructing that the servers 300, 300A, 300B obtain log data stored in the log data storage area 210 (Step S604).

It is to be noted that, it is preferable for the image forming apparatus 200 according to an embodiment of the present invention to communicate with all of the servers included in the image processing system 100 and recognize the servers 300, 300A, 300B connected to the image forming apparatus 200 when the image forming apparatus 200 is connected to the image processing system 100.

When the servers 300, 300A, 300B receive the simultaneously transmitted notice from the image forming apparatus 200, the log obtaining part 320 of each of the servers 300, 300A, and 300B obtains all of the log data stored in the log data storage area 210. Then, the servers 300, 300A, and 300B stores the obtained log data in the log storage part 330, respectively.

After the simultaneous transmission of the notice, the data management part 220 resets the counted number of times of storing the log data and returns to Step S602 (Step S605).

In this embodiment, the log data stored in the log data storage area 210 is not deleted (erased) even after the log data stored in the log data storage area 210 is obtained by each of the servers 300, 300A, and 300B. Further, in this embodiment, the data management part 220 sequentially stores newly generated log data (log data item) in the rearmost part of the log data storage area 210. Then, when the second area 210B becomes full by storing (n+k) log data items in the log data storage area 210, the data management part 220 sequentially deletes (erases) the log data starting from the oldest log data item stored in the log data storage area 210.

Figure 7:
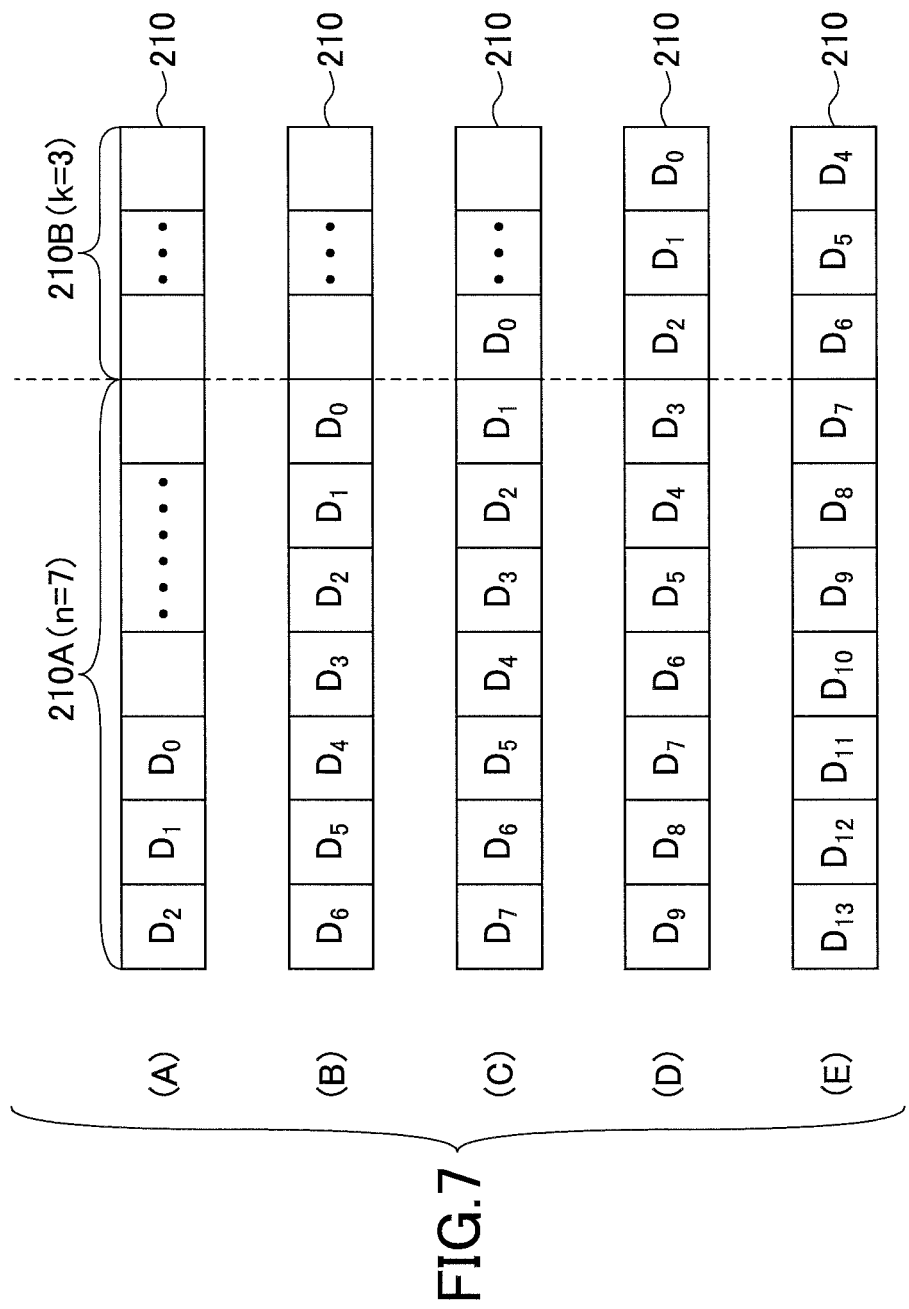
FIG. 7 is a schematic diagram for describing an operation of an image forming apparatus and statuses of a log data storage area according to an embodiment of the present invention.

The operation of the image forming apparatus 200 and the statuses of the log data storage area 210 according to an embodiment of the present invention are described with reference to FIG. 7. FIG. 7 is a schematic diagram for describing the operation of the image forming apparatus 200 and the statuses of the log data storage area 210 according to an embodiment of the present invention. In the embodiment illustrated in FIG. 7, the number of log data items that can be stored in the first area 210A is 7 (n=7), and the number of log data items that can be stored in the second area 210B is 3 (k=3).

(A) of FIG. 7 illustrates a status of the log data storage area 210 where log data items D0-D2 are stored in the first area 210A subsequent to the initialization of the log data storage area 210. (B) of FIG. 7 illustrates a status of the log data storage area 210 where 7 log data items are stored in the first area 210A. When the first area 210A reaches the status illustrated in (B) of FIG. 7, the data management part 220 instructs the notice transmission part 230 to perform the simultaneous transmission to the servers 300, 300A, and 300B. In accordance with the instruction from the data management part 220, the notice transmission part 230 simultaneously transmits the notice to the servers 300, 300A, and 300B. In this embodiment, after the simultaneous transmission is performed by the notice transmission part 230 upon reaching the status illustrated in (B) of FIG. 7, the data management part 220 resets the counted number of times of storing the log data.

(C) of FIG. 7 illustrates a status of the log data storage area 210 where an $8^{th}$ log data item D7 is stored in the log data storage area 210 subsequent to the simultaneous transmission by the notice transmission part 230. In the status of (C) of FIG. 7, the newly stored log data item D7 is stored in the rearmost part of the first area 210A and the log data item D0 being stored first in the first area 210A is forced out to the second area 210B.

(D) of FIG. 7 illustrates a status of the log data storage area 210 where the log data storage area 210 is full in which 10 log data items (i.e. (n+k) log data items) are stored in the log data storage area 210. In a case where an $11^{th}$ log data item is generated in the status of (D) of FIG. 7, the 11$^{th}$ log data item is stored in the rearmost part of the first area 210A and the log data item D0 is deleted from the second area 210B.

(E) of FIG. 7 illustrates a status of the log data storage area 210 where the simultaneous transmission of the notice is to be performed for the second time. In the embodiment of FIG. 7, the data management part 220 instructs the notice transmission part 230 to perform the simultaneous transmission when the storing of log data is performed 7 times. Therefore, it can be understood that the second simultaneous transmission is performed when the storing of log data is performed 14 times. In the status illustrated in (E) of FIG. 7, the 8$^{th}$ to 14$^{th}$ log data items are stored in the first area 210A and the 5$^{th}$ to 7$^{th}$ log data items are stored in the second area 210B. Further, in the status illustrated in (E) of FIG. 7, the 1$^{st}$ to 4$^{th}$ log data items (i.e. D0-D3) are deleted from the log data storage area 210.

For example, in the image processing system 100 according to an embodiment of the present invention, assuming a case where the server 300 receives the simultaneously transmitted notice and obtains log data when the log data storage area 210 is in the status (C) of FIG. 7, the server 300 obtains the log data items D0-D7 and stores the obtained log data items D0-D7 in the data storage part 33.

Then, assuming a case where the server 300 receives the simultaneously transmitted notice and obtains log data immediately after receiving the notice when the log data storage area 210 is in the status (E) of FIG. 7, the server 300 obtains the log data items D4 to D13 and stores the obtained log data items D4-D13 in the data storage part 33.

In the above-described example, the log data items D4 to D7 are obtained twice by the server 300. However, the data management part of the server 300 manages the storing of log data, so that the log data already obtained once by the server 300 is prevented from being stored in the data storage part 330.

With the image forming apparatus 200 according to the above-described embodiment of the present invention, the first area 210A having a capacity capable of storing n log data items and the second area 210B having a capacity capable of storing k log data items are provided in the image forming apparatus 200. Accordingly, in a case where log data is stored in the first area 210A for n times, the image forming apparatus 200 simultaneously transmits a notice indicating that the log data has been stored in the first area 210A for n times to all of the servers 300, 300A, 300B connected to the image forming apparatus 200. Each of the servers 300, 300A, 300B receiving the simultaneously transmitted notice obtains the log data from the image forming apparatus 200 at a timing corresponding to a processing status (e.g., status of data storage part 330) of each server 300, 300A, 300B.

It is preferable for the second area 210B to be set having a configuration (including, for example, storage capacity) enabling the servers 300, 300A, 300B to obtain log data stored in the log data storage area 210 before the log data stored in the second area 210B is deleted.

With the image forming apparatus 200 according to the above-described embodiment of the present invention, by setting the storage capacity of the log data storage area 210 of the image forming apparatus 200 to a predetermined size (value), the simultaneous notice transmission is performed and log data is obtained by the servers 300, 300A, and 300B when the storage capacity of the log data storage area 210 reaches a full or a nearly full state.

Hence, with the above-described embodiment of the present invention, there is no need to provide a storage area having a large storage capacity dedicated for storing log data in the image forming apparatus 200. Further, with the above-described embodiment of the present invention, there is no need for the servers 300, 300A, and 300B, for example, to determine whether log data is stored in the image forming apparatus 200 or confirm the amount of log data stored in the image forming apparatus 200. Hence, with the above-described embodiment of the present invention, a size of the storage area dedicated for storing log data of the image forming apparatus 200 can be reduced, and the workload of obtaining log data by the servers 300, 300A, and 300B can be reduced.

Further, with the above-described embodiment of the present invention, log data stored in the log data storage area 210 can be retained in the log data storage area 210 without being deleted. Even in a case where log data is obtained by plural servers 300, 300A, and 300B connected to the image forming apparatus 200 at different timings, the servers 300, 300A, and 300B can obtain the same log data. Hence, with the image processing system 100 according to the above-described embodiment of the present invention, the servers 300, 300A, and 300B can provide various services using the log data obtained by the image forming apparatus 200.

In the above-described first embodiment, plural servers 300, 300A, and 300B are connected to the image forming apparatus 200. However, the first embodiment may also be applied to a case where a single server is connected to the image forming apparatus 200. In the case where a single server is connected to the image forming apparatus 200, the deletion part 240 of the image forming apparatus 200 may delete the log data stored in the log data storage area 210 after the server obtains log data from the log data storage area 210.

By deleting the log data stored in the log data storage area 210, the server can be prevented from obtaining log data that has already been obtained by the server. Thus, the workload of managing data by the server can be reduced.

[Second Embodiment]

Next, an image processing system 100A according to a second embodiment of the present invention is described. The image processing system 100A according to the second embodiment of the present invention is different from the image processing system 100 of the first embodiment in that the number of log data items stored in the second area 210B of the log data storage area 210 is determined according to a use status of the below-described image forming apparatus 200A. Accordingly, because the image processing system 100A of the second embodiment is substantially the same as the image processing system 100 of the first embodiment except for the aspects related to the aforementioned difference with respect to the first embodiment, only the aspects related to the aforementioned difference with respect to the first embodiment is described below. In the second embodiment, like components are denoted with like reference numerals as those of the first embodiment and are not further described.

Figure 8:
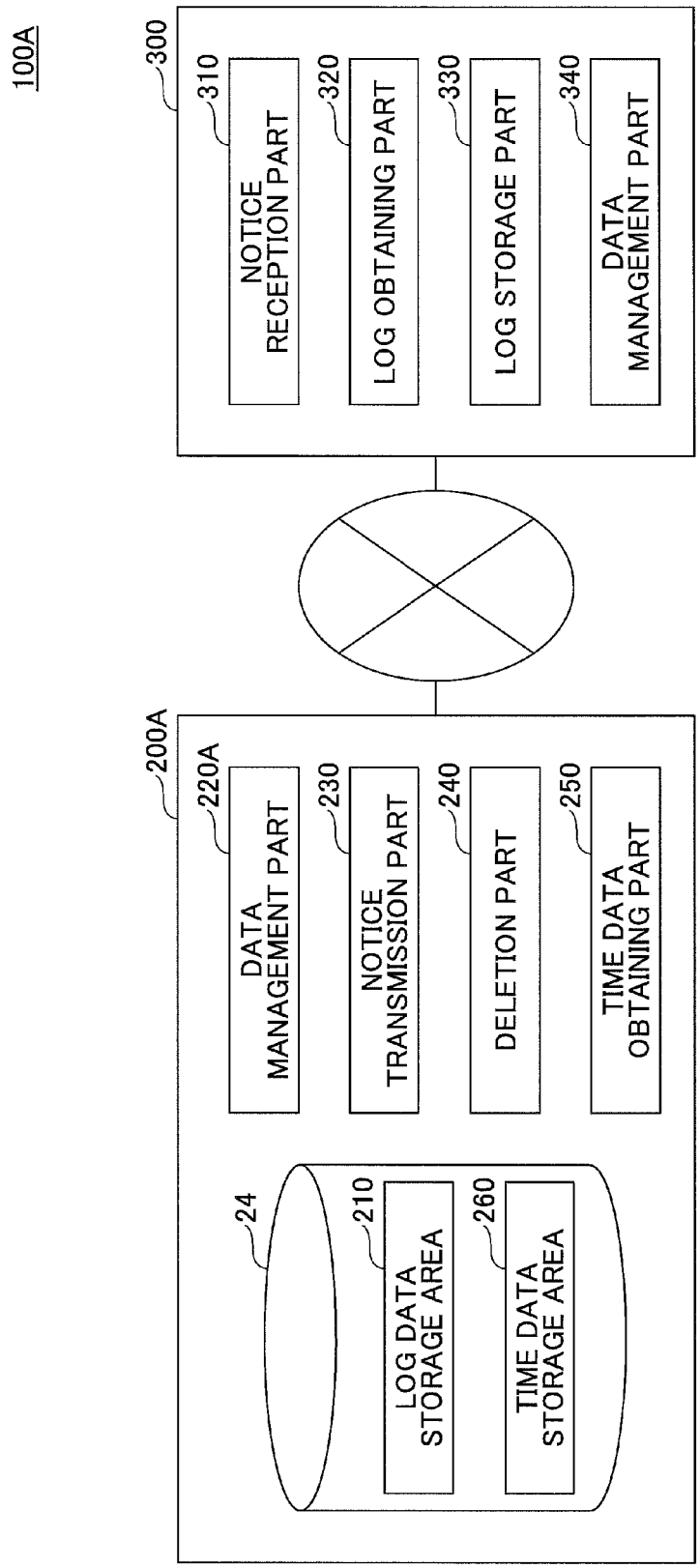
FIG. 8 is a schematic diagram illustrating functional configurations of an image forming apparatus and a server constituting an image processing system according to another embodiment of the present invention.

FIG. 8 is a schematic diagram illustrating the functional configurations of the image forming apparatus 200A and the server 300 constituting the image processing system 100A according to the second embodiment of the present invention. Because the functional configuration of the servers 300, 300A and 300B are substantially the same, FIG. 8 illustrates the functional configuration of the server 300 as an example.

The image forming apparatus 200A includes, for example, a data management part 220A, the notice transmission part 230, the deletion part 240, and a time data obtaining part 250. Further, the image forming apparatus 200A has a time data storage area 260 provided in a storage area of, for example, the HDD 24 thereof.

The time data obtaining part 250 obtains data indicating the number of times of performing the simultaneous transmission to the server 300 from the notice transmission part 230, a first time data indicating the time of the simultaneous transmission (notice time), and a second time data indicating the time in which log data was obtained by the server 300 (log data obtain time) and stores the obtained data in the time data storage area 260.

Further, the time data obtaining part 250 also obtains data indicating the number of log data items that is stored in the second area 210B at the time when log data is obtained by the server 300 (second area storage data) and stores the obtained second area storage data in correspondence with the time when log data is obtained by the server 300 in the time data storage area 260. In this embodiment, it is to be noted that the time when log data is obtained by the server 300 corresponds to the time in which the log data is transmitted from the image forming apparatus 200A to the server 300.

Figure 9:
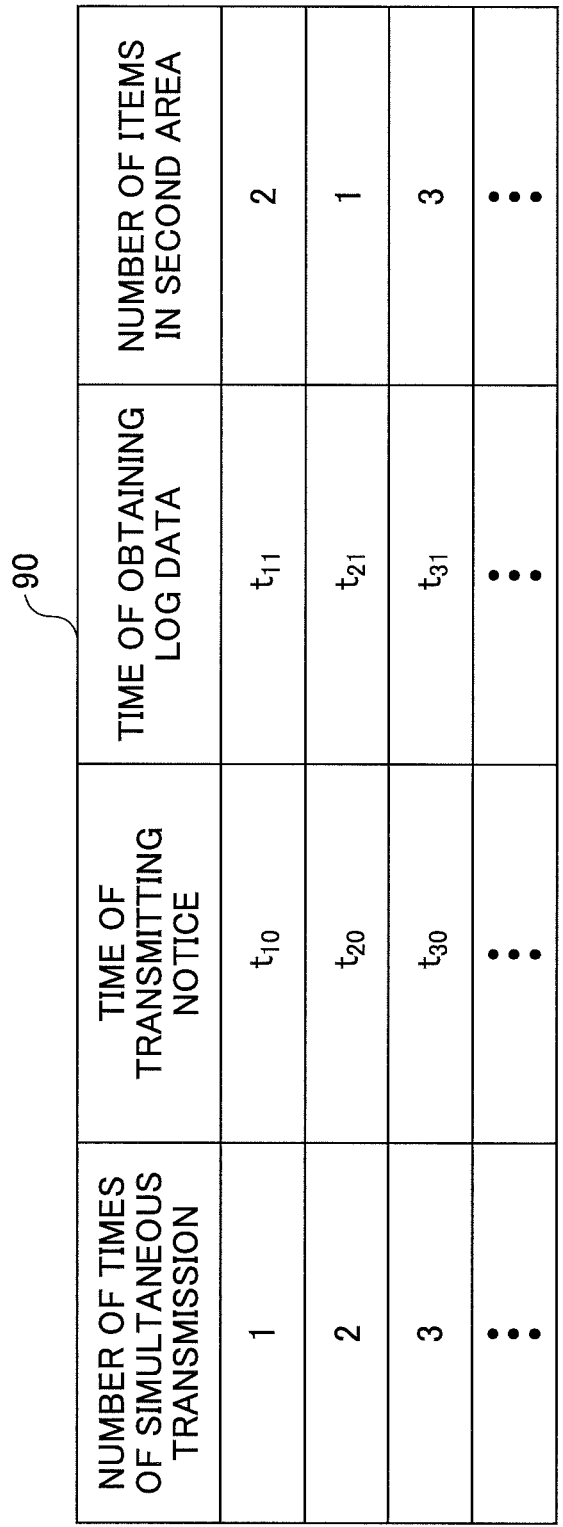
FIG. 9 is a schematic diagram illustrating an example of a time data table according to an embodiment of the present invention.

In this embodiment, the time data obtaining part 250 generates a time data table 90 (as illustrated in FIG. 9) indicating the obtained first and second time data in correspondence with the second area storage data and stores the time data table 90 in the time data storage area 260.

FIG. 9 illustrates an example of the time data table 90. For example, according to the time data table 90 of FIG. 9 in a case where the notice time is the t10 (first notice time) and the log data obtain time is t11, the number of log data items stored in the second area 210B of the log data storage area 210 is 2 log data items. Therefore, the time required for obtaining log data stored in the log data storage area 210 after the simultaneously transmitted notice is received by server 300 is substantially equivalent to the time difference between the log data obtain time t11 and first notice time t10 (i.e. t11−t10).

Further, because two log data items are stored in the second area 210B in the period of the time difference (t11−t10), the image forming apparatus 200A can recognize that two log data items have been generated during the period of the time difference (t11−t10).

Therefore, according to an embodiment of the present invention, whenever the simultaneous transmission is performed, the time data obtaining part 250 obtains data of the notice time, data of the log data obtain time, and data of the number of log data items stored in the second area 210B and stores the obtained data in the time data table 90.

The data management part 220A according to an embodiment of the present invention may determine the size (capacity) of the second area based on the time required for obtaining log data stored in the log data storage area 210 after the simultaneously transmitted notice is received by server 300 (required log obtain time).

Further, the data management part 220A according to an embodiment of the present invention may determine the size (capacity) of the second area based on the number of log data items that was stored in the second area 210B at the time when log data was obtained by the server 300.

Further, the data management part 220A according to an embodiment of the present invention may store data of the notice time, data of the log data obtain time, and data of the number of log data items stored in the second area 210B until the number of times of performing the simultaneous transmission reaches a predetermined number. When the number of times of performing the simultaneous transmission becomes greater than the predetermined number, the data management part 220A may determine the size (capacity) of the second area 210B by referring to the time data table 90 as described in the first and second examples below.

For example, in a case where the number of times of performing the simultaneous transmission becomes greater than 3, the data management part 220A determines the size (capacity) of the second area 210B as follows.

The first example is a case where the data management part 220A determines the size (capacity) of the second area 210B based on the required log obtain time.

In the first example, the data management part 220A calculates the required log obtain time of the server 300 by referring to the data of the notice time for the past 3 times t10, t20, t30 and the data of corresponding log data obtain time t11, t21, t31. For example, the data management part 220A may calculate the average of the differences between the notice time and the log data obtain time for the past 3 times and assume the calculated average as the required log obtain time of the server 300.

Alternatively, the data management part 220A calculates the number of times (frequency) in which log data is generated by the image forming apparatus 100A. Then, the data management part 220A calculates the number of times log data times can be generated within the required log obtain time of the server 300. The calculated number of times log data can be generated within the required log obtain time of the server 300 corresponds to the number of new log data items generated within the required log obtain time of the server 300. Thus, the number of new log data items generated within the required log obtain time of the server 300 corresponds to the number of log data items stored in the second area 210B during a period starting from the time when the server 300 receives the simultaneously transmitted notice to the time when the server 300 obtains log data stored in the log data storage area 210.

Accordingly, the data management part 220A determines the size (capacity) of the second area 210B, so that the number of log data items stored in the second area 210B is more than the number of log data items generated within the required log obtain time of the server 300.

By determining the size (capacity) of the second area 210B as described in the first example, log data can be prevented from being deleted by being forced out from the second area 210B within the required log obtain time of the server 300. Accordingly, the log data stored in the log data storage area 210 can be prevented from being deleted before being obtained by the server 300. Thereby, log data can be safely provided (transmitted) from the image forming apparatus 100A to the server 300.

The second example is a case where the data management part 220A determines the size (capacity) of the second area 210B based on the number of log data items stored in the second area 210B when log data is obtained by the server 300.

In the second example, the data management part 220A refers to the time data table 90 and calculates the maximum number of log data items stored in the second area 210B among the number of log data items indicated in the time data table 90 in correspondence with the number times of performing simultaneous transmission. In the time data table 90 of FIG. 9, the maximum number of data items is 3 when the number of times of performing simultaneous transmission is 3 times. Accordingly, the data management part 220A determines the size (capacity) of the second area 210B, so that the number of log data items stored in the second area 210B is more than the maximum number of log data items indicated in the time data table 90.

By determining the size (capacity) of the second area 210B as described in the second example, log data can be prevented from being deleted by being forced out from the second area 210B within the required log obtain time of the server 300.

Accordingly, the log data stored in the log data storage area 210 can be prevented from being deleted before being obtained by the server 300. Thereby, log data can be safely provided (transmitted) from the image forming apparatus 100A to the server 300.

In the above-described second embodiment, the image forming apparatus 200A is described as being connected to the server 300. However, the second embodiment may also be applied to a case where plural servers are connected to the image forming apparatus 200A. In the case where plural servers are connected to the image forming apparatus 200A according to the first example where the size (capacity) of the second area 210B is determined based on the required log obtain time), the size (capacity) of the second area 210B may be determined based the server having the longest required log obtain time among the plural servers. Thereby, log data can be safely provided (transmitted) from the image forming apparatus 100A to all of the servers.

The same applies to a case where plural servers are connected to the image forming apparatus 200A according to the first example where the size (capacity) of the second area 210B is determined based on the number of log data items stored in the second area 210B in the required log obtain time. That is, in this case, the size (capacity) of the second area 210B may be determined based on the largest number of data items stored in the second area 210B during a period starting from the time when all of the plural servers receive the simultaneously transmitted notice to the time when all of the plural servers obtain log data stored in the log data storage area 210. Thereby, log data can be safely provided (transmitted) from the image forming apparatus 100A to all of the servers.

It is to be noted that the data management part 220A may determine the size (capacity) of the second area 210B in a manner other than those described above. For example, the data management part 220A may determine the size (capacity) of the second area 210B based on specifications or use conditions of the image forming apparatus 200A and the server 300. More specifically, the data management part 220A may determine the size (capacity) of the second area 210B in accordance with, for example, the load of the server 300 or the printing speed of the image forming apparatus when the image forming apparatus 200A is connected to the server 300.

The present invention is not limited to the specifically disclosed embodiments, and variations and modifications may be made without departing from the scope of the present invention.

The present application is based on Japanese Priority Application No. 2010-268378 filed on Dec. 1, 2010, the entire contents of which are hereby incorporated herein by reference.

What is claimed is:

1. An image forming apparatus connected to a plurality of servers, the image forming apparatus comprising:
    a storage part including a log data storage area and configured to store log data into the log data storage area, the log data storage area being divided into a first area capable of retaining a first predetermined number of log data items and a second area capable of retaining a second predetermined number of log data items;
    a data management part configured to manage the storing of the log data into the log data storage area; and
    a notice transmission part configured to instruct the plural servers to obtain the log data stored in the log data storage area by simultaneously transmitting a notice to the plural servers;
    wherein the data management part instructs the notice transmission part to transmit the notice when the number of times of storing the log data becomes equivalent to the first predetermined number,
    wherein the data management part is configured to adjust the second predetermined number based on a difference between a notice time data and a log data obtain time data, and a frequency of the log data generated by the image farming apparatus.

2. The image forming apparatus as claimed in claim 1, wherein the data management part is configured to provide all of the log data stored in the log data storage area to each of the plural servers.

3. The image forming apparatus as claimed in claim 1, further comprising:
    a time data obtaining part configured to obtain the notice time data indicating the time of simultaneously transmitting the notice to the plural servers and the log data obtain time data indicating the time when the log data is obtained by the plural servers and generate a time data table indicating the notice time data in correspondence with the log data obtain time data.

4. The image forming apparatus as claimed in claim 3, wherein the time data obtaining part is configured to obtain the number of the log data items stored in the second area at the time when the log data is obtained and store the number of the log data items in the time data table,
    wherein the data management part is further configured to adjust the second predetermined number based on a maximum number among the number of the log data items stored in the time data table.

5. An image processing system comprising:
    a plurality of servers; and
    an image forming apparatus connected to the plural servers;
    wherein the image forming apparatus includes
        a storage part including a log data storage area and configured to store log data into the log data storage area being divided into a first area capable of retaining a first predetermined number of log data items and a second area capable of retaining a second predetermined number of log data items,
        a data management part configured to manage the storing of the log data into the log data storage area, and
        a notice transmission part configured to instruct the plural servers to obtain the log data stored in the log data storage area by simultaneously transmitting a notice to the plural servers;
    wherein the data management part instructs the notice transmission part to transmit the notice when the number of times of storing the log data becomes equivalent to the first predetermined number,
    wherein the data management part is configured to adjust the second predetermined number based on a difference between a notice time data and a log data obtain time data, and a frequency of the log data generated by the image forming apparatus.

6. An image processing method executed with an image foaming apparatus connected to a plurality of servers, the image processing method comprising:
    storing log data into a log data storage area of the image forming apparatus, the log data storage area being divided into a first area capable of retaining a first predetermined number of log data items and a second area capable of retaining a second predetermined number of log data items;

managing the storing of the log data into the log data storage area; and instructing the plural servers to obtain the log data stored in the log data storage area by simultaneously transmitting a notice to the plural servers;

wherein the notice is transmitted when the number of times of storing the log data becomes equivalent to the first predetermined number, wherein the managing includes adjusting the second predetermined number based on a difference between a notice time data and a log data obtain time data, and a frequency of the log data generated by the image forming apparatus.

* * * * *